United States Patent Office 2,901,452
Patented Aug. 25, 1959

2,901,452

WATER MODIFIED METALLO ORGANIC COMPOUND, METHOD OF MAKING, AND RESINOUS COATING COMPOSITION COMPRISING SAME

Charles Peter West, Metuchen, N.J., assignor to The Harshaw Chemical Company, Cleveland, Ohio, a corporation of Ohio No Drawing. Application August 21, 1956
Serial No. 605,427

7 Claims. (Cl. 260—29.6)

This invention relates to certain new metallo-organic compounds especially useful for modifying the properties of resinous films. More particularly, the invention relates to certain new metal derivatives of dimethylethanol amine which exhibit water solubility, to a process for producing the derivatives and to organic resins modified therewith.

Metallo-organic compounds have found wide usages in the resin arts for the modification of resin in various ways. One of the more important modifications effected by certain metallo-organic compounds is that of increasing the hardness of the resin. Another important effect of certain metallo-organic compounds is that of reducing the water sensitivity of specific resins. It is understood of course that not all metallo-organic compounds exhibit these properties when incorporated in resins and in fact certain metallo-organic compounds are used merely for certain specific purposes such as that of accelerating the drying of films, etc. The function of increasing the hardness through the employment of a metallo-organic compound is usually attributed to the actual molecular combination of the metal through, for example, oxygen linkages with adjacent molecules in polymers, copolymers or heteropolymers as the case may be. The mechanism is generally believed to be one wherein the metal links with the polymers, etc. through groups thereof containing an active hydrogen. Examples of groups containing active hydrogen are evident to those skilled in the art, but hydroxy, carboxy and amino groups serve to exemplify them.

Among the more recent metallo-organic compounds finding use in resinous mixtures for cross-linking purposes through groups containing active hydrogen are the metal alcoholates. As a general rule however the alcoholates are restricted in their applications to the "solvent systems" wherein the resin and metal alcoholate are combined in an organic solvent and the resin cross-linking accomplished during the evaporation of the organic solvent. This restriction in use is due to the general sensitivity of the alcoholate to hydrolysis upon contacting water. Since the metal oxide is produced upon hydrolysis and the oxide is relatively unreactive with active hydrogen containing groups of resinous mixtures, it is apparent that readily hydrolyzable metallo-organic compounds may not be employed in aqueous systems. Specific types of metal alcoholates have apparently been produced which exhibit a decreased tendency to hydrolyze upon contacting small quantities of water. However, insofar as I am aware there are no metallo-organic compounds of the alcoholic type described herein available commercially which in themselves or as modified may be considered as exhibiting water solubility or which may be employed for modifying the properties of resinous films obtained from aqueous solution.

According to my invention, I have found that certain metal derivatives of dimethylethanol amine may be modified so as to become soluble in such polyalcohols as ethylene and propylene glycol. As such the glycol soluble compounds exhibit water solubility and are reasonably stable therein under the room temperature conditions usually encountered in preparing paint formulations. The glycol modified compounds of the invention described herein have been found stable after as long as three weeks in contact with water. Consequently, they may initially be admixed with resins dissolved or dispersed in aqueous solutions and because of their increased stability in aqueous solutions, as compared to most metallo-organic compounds, permitted to cross-link the molecules in polymeric systems during evaporation of the water at room temperature or at elevated temperatures. Preferably, in the preparation of a paint mixture, dimethylethanol amine is also added as a stabilizer for the novel compounds to prevent gellation since the compounds are reactive with respect to polymers containing active hydrogen groups. However, the type of solubility exhibited by my novel compounds is to be contrasted with the relative insolubility exhibited by most metal esters in aqueous solutions thereof. Most metallo-alcoholates almost instantaneously gel or precipitate the metal oxide when dispersed in water. It will be apparent to those skilled in the art that this water solubility and minimized tendency to hydrolyze is especially beneficial for effecting cross-linking of resins in aqueous solutions.

I have found that zirconium, tin and aluminum derivatives of dimethylethanol amine obtained as a precipitate by reacting the corresponding metal chloride with dimethylethanol amine may be dissolved in polyhydric alcohols such as ethylene and propylene glycol by modifying the precipitate with trace quantities of water and that the glycol solution thereof is soluble in water. The invention will hereinafter be more specifically illustrated by matter relating to the zirconium derivative of dimethylethanol amine as produced from zirconium tetrachloride and dimethylethanol amine. It will be appreciated however that the corresponding aluminum and tin derivatives may similarly be produced and that the bromide and iodine may be substituted for the chloride in the initial metallic reactant. Other methods of producing the basic derivatives will of course also be apparent.

The precipitate referred to and which may be considered the "basic derivative" of the metal and dimethylethanol amine may be produced substantially in accordance with the procedure set forth broadly with reference to organic amines and metal halides in the U.S. Wainer Patent No. 2,269,498, except that the precipitate obtained from the reaction involving the tetrachloride of zirconium and dimethylethanol amine in the case of the instant invention is separated from the balance of the solvent upon its formation and thereafter treated as indicated hereinafter. For example, zirconium tetrachloride may be dispersed in a suitable anhydrous solvent such as diethyl ether, hexane or toluene, and anhydrous dimethylethanol amine thereafter slowly added, preferably under refluxing conditions. The molar proportions of the dimethylethanol amine to metal halide employed in the reaction should be about 4 for zirconium and tin derivatives and about 3 for the aluminum derivative. The precipitate of the basic derivative obtained may be exemplified by the following general formula:

$$(AmX)_y M$$

wherein

Am represents dimethylethanol amine
X represents a halogen such as chlorine, and
M represents a metal selected from the group consisting of zirconium, tin and aluminum $y$ represents an integer corresponding to the primary valence of the metal, e.g. four for zirconium and tin and three for aluminum.

For example, the preferred molar ratio of dimethylethanol amine to zirconium tetrachloride in the preparation of the basic derivative is 4. Experiments varying the ratio of the reactants have resulted in products having different properties. For example, when an excess of the amine is employed, the product obtained is insoluble in propylene glycol. On the other hand, when an excess of tetrachloride is employed, the product resulting spontaneously decomposes upon standing.

To effect solubility of the precipitate in, for example, propylene glycol, trace quantities of water are added to the basic derivative. When the solvent employed for producing the precipitate is not strictly anhydrous but contains trace amounts of water, it will be found that the basic derivative is not produced but rather a glycol soluble product is produced. Quantities of water either added to the basic derivative or present in the solvent for the reaction in excess of the trace amounts exemplified herein have been found to produce a product which is not soluble in glycol. By employing the phrase "trace amounts" or "trace quantities" of water herein, there is intended, the addition of water, to the precipitate or to the anhydrous solvent employed in the formation thereof, in amounts generally falling between about .1 mol of water and about .7 mol of water per mol of the basic derivative. When less than .1 mol of water is added, it will be usually found that the water modified precipitate is insoluble in the glycol and similarly when greater than .7 mol of water are added, it will be found that the product is insoluble in glycol. The solubility of the water modified product in propylene glycol, for example, appears to increase with the addition of water in amounts exceeding .1 mol thereof per mol of precipitate to the point where maximum solubility is obtained with molar proportions of water added thereto from about .3 to about .5 mol. Water modified products containing in excess of about .5 mol of water per mol of basic derivative to about .7 mol exhibit diminished solubilities in glycol as the amount of water is increased and above about .7 mol of water per mol of basic derivative, the product appears to be insoluble in glycol.

The exact formula for the water modified precipitate is not known and the mechanism of the reaction is not fully understood. It is believed however that the water acts as a coupling agent permitting the solution of the precipitate or basic derivative in the glycol. It appears that the formula of the product obtained upon dissolution in polyhydric alcohols such as ethylene or propylene glycol may be exemplified as follows:

$$(AmX)_y M(Gly)_n$$

wherein

Am represents dimethylethanol amine,
X represents a halide such as chlorine,
M represents a metal selected from the group consisting of zirconium, tin and aluminum,
Gly represents a polyalcohol as, for example, selected from the group consisting of ethylene and propylene glycol,
$n$ represents an integer from 1 to 4 corresponding to a coordinate valence of the metal, and
$y$ represents an integer corresponding to the primary valence of the metal.

It appears that the glycol forms a true chelate with the free coordinate valences of the metal such as zirconium and thereby retards the hydrolysis of the compound upon dissolution in water. The coordinate valance of zirconium may be from 1 to 4 whereas tin exhibits a coordinate valence from 1 to 2 and aluminum exhibits a coordinate valence from 1 to 3.

The following examples exemplify the preparation of the water modified basic metal derivatives of dimethylethanol amine and the dissolution thereof in glycols.

*Example I*

23.3 grams, amounting to .1 gram mol, of zirconium tetrachloride were dispersed in 300 ml. of anhydrous diethyl ether. Cooling of the dispersion was effected during the addition since the reaction involving the dispersement was exothermic. 35.7 grams, amounting to .4 gram mol, of anhydrous dimethylethanol amine were then added dropwise to this solution containing .1 mol of zirconium tetrachloride. The initial reaction of the amine and tetrachloride was exothermic and reflux was maintained by stirring and regulating the addition of the amine. After about 60% of the amine had been added, addition of external heat was necessary in order to maintain reflux condition. The reaction was stopped on the total addition of the amine.

On the addition of the dimethylethanol amine there was an immediate appearance of a white precipitate, and after all of the amine had been added, the reaction mixture was cooled and the precipitate removed by filtration through cheese cloth. Thereafter the residue was washed twice with 50 ml. portions of the ether.

The product obtained was hygroscopic and on exposure to atmospheric moisture, the external layer of the precipitate turned green and became gummy. Traces of water were then added to the mixture to just transform the entire product to this green gum-like mass. It was found that this hydrated product was soluble in propylene glycol and a solution thereof was prepared containing 20% by weight of the hydrated precipitate. It was also found that the reaction product was soluble in ethylene glycol although insoluble in methyl carbitol and ethyl Cellosolve.

*Example II*

Analogous tin and aluminum derivatives of dimethylethanol amine may be prepared utilizing molar proportions corresponding to their primary valences namely 4 and 3 respectively and reaction conditions employed for the preparation of the zirconium derivative described in Example I.

It will be found that the tin and aluminum derivatives are similarly soluble in propylene and ethylene glycols.

*Example III*

As another example exemplifying the process for producing the novel compounds described herein and particularly useful as indicating the amounts of water added to the precipitate to effect propylene glycol solubility, 35.7 grams, amounting to .4 gram mol, of anhydrous dimethylethanol amine were added dropwise to 23.3 grams, amounting to .1 gram mol, of zirconium tetrachloride dispersed in 250 mls. of anhydrous diethyl ether substantially in accordance with the procedure set forth in Example I. The reaction mixture was kept at reflux throughout the addition of the amine or at approximately 35° C. Again there was an immediate appearance of a white precipitate. The white precipitate was filtered from the anhydrous solvent and washed with ether. Thereafter calibrated amounts of water were delivered to the reaction mixture and the solubility of the water modified precipitate tested in propylene glycol. Analysis of the filtrate for unreacted dimethylethanol amine indicated that about 90% of the dimethylethanol amine reacted to form a basic derivative having substantially the following formula:

$$(AmCl)_4 Zr$$

The following table indicates the proportions of water added to the entire mass of precipitated basic derivative obtained and the relative solubility of successively removed 1 gram samples of the water modified precipitate in 5 grams of propylene glycol.

| Gram Mols of Water Added to the Precipitated Reaction Mixture | Solubility in 5 grams of Propylene Glycol of Successive 1 gram Samples Withdrawn from the Precipitate |
|---|---|
| 0 | Insoluble. |
| 0.01 | Slightly soluble. |
| 0.02 | More soluble than above. |
| 0.03 | Soluble. |
| 0.04 | Do. |
| 0.05 | Do. |
| 0.06 | Less soluble than above. |
| 0.07 | Slightly soluble. |
| 0.08 | Insoluble. |

*Example IV*

As another example exemplifying the production of the basic derivative and the modification thereof with water to form a propylene glycol soluble compound, 35.7 grams, amounting to .4 gram mol, of dimethylethanol amine were added dropwise to 23.3 grams, amounting to .1 gram mol, of zirconium tetrachloride dispersed in 250 ml. of anhydrous toluene which had been previously dried with anhydrous magnesium sulfate. The method of addition and conductance of the reaction was substantially identical to that set forth in Example I except that the temperature employed was about 30° C. The orange-yellow color of the dispersion of zirconium tetrachloride in toluene changed to an off-white colored slurry on the continued addition of the amine. After filtering and washing the reaction product, analysis of the filtrate indicated that about 88.5% of the dimethylethanol amine reacted to form a compound exemplified by the following formula:

$$(AmCl)_4Zr$$

To ascertain the trace amount of water which must be added to effect solubility of the reaction product in propylene glycol a test series was run with calibrated amounts of water added to the precipitate as indicated in the prior example. Successively 1 gram samples were withdrawn from the precipitated mass of basic derivative and the relative solubilities of the resulting water modified product determined in 5 gram samples of propylene glycol. The following table sets forth the results:

| Gram Mols of Water Added to the Precipitated Reaction Mixture | Relative Solubility in 5 grams of Propylene Glycol of Successive 1 gram Samples Withdrawn from the Precipitate |
|---|---|
| 0 | Insoluble. |
| .02 | Slightly soluble. |
| .03 | Soluble. |
| .04 | Do. |
| .05 | Slightly soluble. |
| .06 | Insoluble. |
| .075 | Do. |

*Example V*

As still another example exemplifying the process and product of the herein described invention, 35.7 grams, amounting to .4 gram mol, of dimethylethanol amine were added dropwise to 23.3 grams, amounting to .1 gram mol, of zirconium tetrachloride dispersed in 250 mols of commercial hexane. No attempt had been previously made to render the hexane anhydrous and accordingly the hexane utilized as a solvent for the reaction may be considered as having trace quantities of water associated therewith. The orange-yellow color of the zirconium tetrachloride dispersion changed to an off-white slurry on the continued addition of the amine. The temperature of the reaction was about 33° C. and it was conducted substantially in accordance with the procedure set forth in Example I. It was found that the precipitated product after washing with hexane was soluble in propylene glycol. This exemplifies the fact that the trace quantities of water may be present in the organic solvent during the formation of the precipitate.

It will be found in the preparation of the metal derivative of dimethylethanol amine that temperature conducive to refluxing are preferred although temperatures as low as 0° C. have been employed for conducting the reaction. It is apparent from the above examples that the solvent utilized may be anhydrous or contain the trace quantities of water necessary for effecting the modification of the precipitate so as to obtain the glycol solubility. Although diethyl ether, hexane and toluene have been utilized to exemplify the solvent employed for the conduct of the reaction, it will be apparent that other solvents may of course be employed according to the invention, the principal function of the solvent being to cause intimate contact between the respective reactants, nevertheless, without entering into the reaction with the products or with the reactants utilized.

The water modified metallo-organic compounds of the instant invention may be utilized in various types of aqueous systems for effecting cross-linkage between polymers, copolymers and heteropolymers having reactive hydrogen containing groups available therefor. It has been found however that the water modified metallic derivatives of dimethylethanol amine are especially useful when employed in paint formations containing polyvinyl acetate or polyvinyl alcohol. In such cases, the novel compounds decrease the water sensitivity of the resinous films as well as increase the hardness and promote heat stability thereof. In such systems it has been found preferable to utilize the water modified basic metallic derivatives of dimethylethanol amine in amounts ranging from about 2% to about 20% by weight of the polyvinyl acetate and/or polyvinyl alcohol resin employed. Lesser quantities of water modified derivatives of dimethylethanol amine may be employed of course since trace quantities will obviously effect some modification of the resin properties. Similarly higher quantities than those indicated may be employed but in general it has not been found that quantities in excess of about 25% by weight based on the resin solids content are desirable.

In addition to utilizing the metallic derivative of dimethylethanol amine, it has been found that from about 2% to about 20% by weight of dimethylethanol amine on the basis of the resin solids is also helpful in further stabilizing the system to prevent premature cross-linking as evidenced by gelation since the compounds are reactive with respect to polymers containing active hydrogen groups.

Specific examples of paint formulations utilizing the novel compounds are set forth hereinafter.

*Example VI*

A polyvinyl acetate latex paint formulation was prepared by first dispersing the pigments in the protective colloid by passing the following through a colloid mill at a 3-mil setting:

| | Grams |
|---|---|
| Carboxymethylcellulose (2% by weight in water) | 170 |
| Water | 221.6 |
| Tetrapotassium pyrophosphate | 2 |
| Iso-octyl phenoxy polyoxyethylene ethanol (a non-ionic wetting agent) | 2.8 |
| TiO$_2$ (pigment grade) | 250 |
| Magnesium silicate (extender) | 40 |
| Mica (extender) | 20 |

The paste was utilized in three separate paint formulations prepared by mixing the following ingredients in their indicated proportions:

| Film No. | (1) | (2) | (3) |
|---|---|---|---|
| | Gms. | Gms. | Gms. |
| Paste | 87.2 | 87.2 | 87.2 |
| Water | 25.0 | 25.0 | 25.0 |
| Polyvinyl acetate (55% solids content) | 48.0 | 48.0 | 48.0 |
| Anti-Foam Agent | 1.2 | 1.2 | 1.2 |
| Water modified zirconium derivative of dimethylethanol amine dissolved in propylene glycol (17.6% solids content) | 18.9 | | |
| Dimethylethanol amine | 2.64 | 2.64 | |
| Propylene glycol | | 16.26 | 16.26 |

3 mil wet films were drawn down on tin plates for each of the above formulations whereafter the plates were baked at 250° F. for 30 minutes.

The properties of the respective paint formulae and films are indicated below:

| Film No. | (1) | (2) | (3) (Control) |
|---|---|---|---|
| Flexibility (over ⅛" mandrel) | Excellent | Slight Cracking | Slight Cracking |
| Toughness | do | Soft | Soft. |
| Adhesion | Very good | Poor | Poor. |
| Discoloration | None | None | None. |
| Scrub Resistance Cycles to failure on a Gardner machine [1] | 730 | 180 | 270. |
| Viscosity of formula (initial) | 75 KU | 55 KU | 62 KU. |
| Viscosity of formula after 12 days | 73 KU | 57 KU | 61 KU. |

[1] Scrub resistance tests were run on films drawn down on glass panels after air drying for six days.

The superiority of the film modified by the zirconium derivative is evident from a comparison of the flexibility, toughness, adhesion and scrub resistance of film 1 with film 3, the control. Film 2 shows that the beneficial properties are attributed to the metallo-organic compound instead of to the glycol solvent and water stabilizer also added. The viscosity of the initial formulae utilized for film 1 when compared to the viscosity thereof after 12 days clearly shows the stability thereof.

Similar results may be obtained utilizing gum tragacanth as the protective colloid.

*Example VII*

For another example three clear films were prepared by admixing the following:

| Film No. | (1) | (2) | (3) |
|---|---|---|---|
| | Grams | Grams | Grams |
| Polyvinyl alcohol (8% aqueous solution) | 30 | 30 | 30 |
| Water modified zirconium derivative of dimethylethanol amine in propylene glycol (17.6% solids) | .82 | | |
| Propylene glycol | | .676 | .676 |
| Dimethylethanol amine | .144 | .144 | |

In this case film 1 containing the novel additive showed no discoloration after baking at 300° F. for 45 minutes, whereas both films 2 and 3 were badly discolored. Film 1 also exhibited improved water resistance.

*Example VIII*

As another example, three films were prepared by admixing the following:

| Film No. | (1) | (2) | (3) |
|---|---|---|---|
| | Grams | Grams | Grams |
| Polyvenylacetate (55% solids) | 100 | 100 | 100 |
| Polyvinyl alcohol (6% aqueous sol.) | 100 | 100 | 100 |
| Water modified zirconium derivative of dimethylethanol amine in propylene glycol (17.6% solids) | 30.5 | | |
| Propylene glycol | | 24.4 | 24.4 |
| Dimethylethanol amine | 6.1 | 6.1 | |

Five mil wet draw downs on tin plate were made for each plate and thereafter baked at 250° F. for 30 minutes. Film 1 exhibited relatively greater resistance to water, better adhesion and hardness than either of the control films numbered 2 and 3.

*Example IX*

Utilizing water modified tin or aluminum derivatives of dimethylethanol amine in place of the zirconium derivative utilized in Example VII, it was found that the film exhibited excellent flexibility, increased hardness, good adhesion, no discoloration and very good scrub resistance.

I claim:

1. As a new water soluble composition the reaction product of a metallo-organic compound and a polyalcohol, said metallo-organic compound being mixed prior to reaction with the polyalcohol with .1 to about .7 mol of water per mol of said metallo-organic compound and said reaction product having the following characteristic formula:

$$(AmX)_y M(Gly)_n$$

wherein

Am represents dimethylethanol amine,
X represents a halogen selected from the group consisting of chlorine, iodine and bromine,
M represents a metal selected from the group consisting of zirconium, tin and aluminum,
Gly represents a polyalcohol selected from the group consisting of ethylene and propylene glycols,
$n$ represents an integer from 1 to 4 corresponding to a coordinate valence of the metal, and
$y$ represents an integer corresponding to a primary valence of the metal.

2. The new compound according to claim 1, where M is zirconium and X is chlorine.

3. The method of preparing a water soluble composition comprising reacting a metallo-organic compound and a polyalcohol, said metallo-organic compound being mixed prior to reaction with the polyalcohol with .1 to about .7 mol of water per mol of said metallo-organic compound and said reaction product having the following characteristic formula:

$$(AmX)_y M(Gly)_n$$

wherein

Am represents dimethylethanol amine,
X represents a halogen selected from the group consisting of chlorine, iodine and bromine,
M represents a metal selected from the group consisting of zirconium, tin and aluminum,
Gly represents a polyalcohol selected from the group consisting of ethylene and propylene glycols,
$n$ represents an integer from 1 to 4 corresponding to a coordinate valence of the metal, and
$y$ represents an integer corresponding to a primary valence of the metal.

4. The method according to claim 3, where zirconium tetrachloride and dimethylethanol amine are mixed in amounts sufficient to produce a metallo-organic compound having the characteristic formula wherein X is chlorine, M is zirconium, and $y$ is 4, said zirconium tetrachloride and the dimethylethanol amine being mixed in an organic solvent containing from about .1 to about .7 mol of water per mol of metallo-organic compound to be prepared, whereby said metallo-organic compound is simultaneously prepared and mixed with water to form a precipitate of a water mixed metallo-organic compound, thereafter separating said precipitate from the organic solvent and dissolving said precipitate in said polyalcohol to the extent that 1 to 4 mols of said polyalcohol are combined with each mol of organo-metallic compound.

5. The method according to claim 3, where zirconium tetrachloride and dimethylethanol amine are mixed in amounts sufficient to produce a metallo-organic compound having the characteristic formula, where X is chlorine, M is zirconium, and y is 4, said zirconium tetrachloride and dimethylethanol amine being mixed in an anhydrous organic solvent whereby said metallo-organic compound is precipitated, thereafter separating said precipitate from said organic solvent, mixing from .1 to about .7 mol of water per mol of metallo-organic compound with said precipitate to form the water mixed metallo-organic compound and thereafter dissolving said precipitate in said polyalcohol to the extent that 1 to 4 mols of said polyalcohol are combined with each mol of metallo-organic compound.

6. A resinous composition comprising an aqueous solution of the new composition claimed in claim 1 wherein said solution also contains at least one resin selected from the group consisting of polyvinyl acetate and polyvinyl alcohol, said new composition being present in said solution in an amount from about 2% to about 20% by weight of the resin, the amount of said new composition being reported as the weight of the metallo-organic compound plus the water content thereof.

7. A resinous composition comprising an aqueous solution of the new composition claimed in claim 2 wherein said solution also contains at least one resin selected from the group consisting of polyvinyl acetate and polyvinyl alcohol, said new composition being present in said solution in an amount from about 2% to about 20% by weight of the resin, the amount of said new composition being reported as the weight of the metallo-organic compound plus the water content thereof.

References Cited in the file of this patent
UNITED STATES PATENTS
2,269,498    Wainer _____ Jan. 13, 1942